United States Patent [19]

Castelaz

[11] Patent Number: 4,982,439

[45] Date of Patent: Jan. 1, 1991

[54] FINE-GRAINED MICROSTRUCTURE PROCESSOR

[75] Inventor: Patrick F. Castelaz, Yorba Linda, Calif.

[73] Assignee: Hughes Aircraft Company, Los Angeles, Calif.

[21] Appl. No.: 325,264

[22] Filed: Mar. 17, 1989

[51] Int. Cl.$^5$ .............................................. G06K 9/00
[52] U.S. Cl. ...................................... 382/42; 382/18; 382/30; 382/34; 364/728.05; 364/728.03; 364/604; 250/211 R
[58] Field of Search ..................... 382/42, 18, 34, 30; 364/604, 728.03, 728.05, 820, 823

[56] References Cited

U.S. PATENT DOCUMENTS

| | | | |
|---|---|---|---|
| 3,483,421 | 12/1969 | Hogan | 364/820 |
| 4,155,004 | 5/1979 | Schulz | 250/211 R |
| 4,161,034 | 7/1979 | Stark | 364/604 |
| 4,164,728 | 8/1979 | Marsh | 364/728.05 |
| 4,475,238 | 10/1984 | Everhart | 382/34 |
| 4,547,864 | 10/1985 | Kawabata | 382/42 |
| 4,654,876 | 3/1987 | Atkins | 382/42 |
| 4,660,164 | 4/1987 | Leibowitz | 364/728.03 |
| 4,669,054 | 5/1987 | Schlunt et al. | 382/42 |

Primary Examiner—Leo H. Boudreau
Assistant Examiner—Yon Jung
Attorney, Agent, or Firm—Wanda K. Denson-Low

[57] ABSTRACT

A Fine-Grained Microstructure Processor (FMP) (10) for solving assignment and correlation problems that utilizes a pair of arrays (22, 24) of cells (26) to represent the position of two set of two-dimensional data points (14). The arrays (22, 24) are divided by a predefined shaped (16) having a plurality of regions (18). The FMP (10) counts the number of data points (14) in each region (18) and then finds the difference between the resulting sums from corresponding regions (18) in the two arrays (22, 24). The differences for each regions (18) are added together by an accumulator (34) to determine a correlation factor. The data in the second array (24) is then shifted until a different data point (14) occupies a particular position with respect to the predefined shape (16) and a new correlation factor is found. The FMP (10) finds a correlation factor for each data point (14) in the second array (24) and the lowest correlation factor represents the best match between a data point (14) in the first array (22) at a particular position with respect to the predefined shape (16), and the point in the second array (24) yielding the best match. The FMP (10) may then shift the data in the first array (22) and repeat the above process to match each data point (14) in the first array (22) with a data point (14) in the second array (24).

16 Claims, 6 Drawing Sheets

FINE-GRAINED MICROSTRUCTURE PROCESSOR

BACKGROUND OF THE INVENTION

1. Technical Field

This invention relates to information processors, and more particularly to a Fine-Grained Microstructure Processor for associating, or correlating, one set of two-dimensional data with another.

2. Discussion

Assignment and correlation problems are among the most difficult to solve using conventional information processors. Assignment problems include those in which a number of entities are to be selected from among many and assigned to other entities in such a way as to force the entire assignment over all entities to be optimal in some sense. In correlation problems entities in one set of data are correlated with entities in another set of data. These problems are difficult to solve because they are not generally solvable with a single solution but, instead there may be a range of solutions of which the best solution is sought. Moreover, these problems frequently involve a combinatorial explosion or exponential blowup in the number of possible answers.

Examples of assignment and correlation problems include, among others, resource allocation, object association, two-dimensional position-only track initiation, deghosting for angle-only targets detected by multiple sensors, pattern matching of two-dimensional feature vectors, template matching and two-dimensional filtering.

Previous approaches in this area have emphasized solutions in software on both general purpose and special purpose (vector, array, systolic, etc.) computers. The disadvantage of a software approach is that it requires explicit algorithm nd software development and massive computational power. In addition, software solutions are not feasible for application to real-time or near real-time problems. For example, for two-dimensional position-only track initiation problems, estimates for conventional approaches indicate that for a scenario of N objects detected by a sensor, the best conventional algorithms would require on the order of N squared operations. For example, including minimum estimates for memory access and other overhead, with N equal to 100,000 about $10^{11}$ operations per scan would be required. For a ten second scan this equates to 10 billion operations per second, well beyond the realm of conventional solutions.

Another approach to solving these problems is a technique called simulated annealing. See S. Kirkpatrick, Glatt, and Vecchi: "Optimization By Simulated Annealing", 220 Science, p. 671–680 (1983). However, while algorithms using this approach have been developed, to the applicant's knowledge, actual working architecture have not been implemented. Also, in the image processing domain, systolic and single-planar correlation processors may exist, but are usually limited to in-plane interconnect structures with fixed templates or two-dimensional filtering structures.

Thus, it would be desirable to provide an information processor that can solve assignment and correlation problems of realistic sizes in real-time. It would further be desirable to provide a processor capable of solving these problems without requiring extensive algorithm and software development. Also, it would be desirable to provide such a processor, which can be easily implemented in hardware, while requiring a minimum of size, weight, and power.

SUMMARY OF THE INVENTION

Pursuant to the present invention, an information processor is provided capable of solving assignment and/or correlation problems of realistic sizes in real-time. The processor incorporates massive parallelism and an interconnected "architecture algorithm" design. Rather than performing an assignment via optimization, the present invention performs a pattern match association.

The present invention is a Fine-Grained Microstructure Processor (FMP) that utilizes many simple processing elements interconnected in a grid structure of individual cells. The FMP accepts as input two sets of data and produces as output associated sets of data so that each point in the first set is associated with one data point in the second set. One data point is stored in each cell, and the interconnection structure within each set of data is fixed to represent the position of the data point relative to all other data points for that set of data within a predefined local region. The interconnect structure from the first set of data to the second is fixed so as to simultaneously correlate data in all predefined regions of one set of data with all data in corresponding regions of the other set, in order to determine an overall correlation measure between the two sets of data for a given position of the data. This processing repeats until all data points are correlated from the first data set to the second.

The interconnect structure is used to effectively scan around the predefined local regions and form a representation of the data point with respect to both the microstructure and the macrostructure of all neighboring points within the local region. This information is then used to associate a point in the first set of data with the "most similar" point in the second set.

In more detail, the FMP provides two arrays of cells, one for each possible location of a data point in the first set of data and one for possible locations in the second set. The cellular arrays are divided by a predefined shape and that shape is further divided into a number of regions. The two sets of two-dimensional data are stored in the cells in locations that maintain the relative position between data points. The FMP counts the number of cells in each region having data points and finds the difference between the numbers of such cells in the first array and the number of such cells in the second array.

In this way, the FMP compares the similarity between regions with respect to the number of data points located in corresponding regions. The resulting differences from each region are then added up. This result is a number, or correlation factor, which corresponds to the global similarity between the first and second sets of data for a particular position of the data with respect to the predefined shape. For example, for cells that are located at the center of the predefined shapes in the first and second arrays, the correlation factor is a measure of the similarity between the 1st and 2nd sets of data in the distribution of surrounding data points.

The above process can then be repeated when other cells in the second array are at the center of the predefined shape and the resulting sum determined. Shifting of the data in the second array until a different point is at the center of the predefined shape may be accomplished by shifting all of the data from cell to cell, while preserving the relative relationship between data points. This process can be repeated for each data point until a correlation factor is computed for the case of each data point when it is at the center of the predefined shape. The minimum correlation factor will yield the best match. The data points which were at the center of the predefined shape when the best match was achieved are then associated with each other and stored.

The entire process can then be repeated for other points in the first array. That is, the data in the first array may now be shifted until a different data point is at the center of the predefined shape in the first array. Correlation factors are then computed with each possible data point in the center of the predefined shape in the second array; the smallest correlation factor will again yield the point in the second array which best correlates with the point in the first array. This procedure can be repeated until all data points in the first array have been matched with points in the second array. The result is a "pattern match" association, which can be used to rapidly solve both correlation and association problems.

BRIEF DESCRIPTION OF THE DRAWINGS

The various advantages of the present invention will become apparent to one skilled in the art by reading the following specifications and by reference to the following drawings in which.

DESCRIPTION OF THE PREFERRED EMBODIMENTS

In the preferred embodiments the FMP is adapted to perform object association and track initiation for two-dimensional position-only data. Such data may be derived from a sensor which detects the location of objects in two dimensions. For example, the sensor may be a sonar, infrared, optical, or other passive sensor configuration. The FMP is particularly well suited to application where there are large numbers of objects sensed and/or where high speed object association and track initiation is required.

It is assumed that within the time frame of the processing of the FMP, the object to be tracked moves in a path that may be linear or nonlinear but is not discontinuous. The time frame between the first set of object reports, or first scan, and the second scan will depend on the application, but may be ten seconds, for example.

The FMP will then operate on two-dimensional object reports contained in a pair of scans, and the task will be to assign each object report in the first scan with an object report in the second scan. The FMP will do this by finding an object report in the second scan in which the microstructure and macrostructure of the neighboring reports is most similar. In many applications, the similarity in the structure of neighboring objects will be more apparent in regions closest to the object. That is, near neighbors may contribute more to the correlation than more distant objects. Because of this, it has been found that a spiral, or snail, shape is a useful shape for dividing up the individual scans for correlating. The snail shape segments the space into smaller shapes near a given object that is at its center, and gives a coarser segmentation farther away. It should be noted that for other applications it may be desirable to use other shapes in which points farther away from an object are given greater importance.

Figure 1:
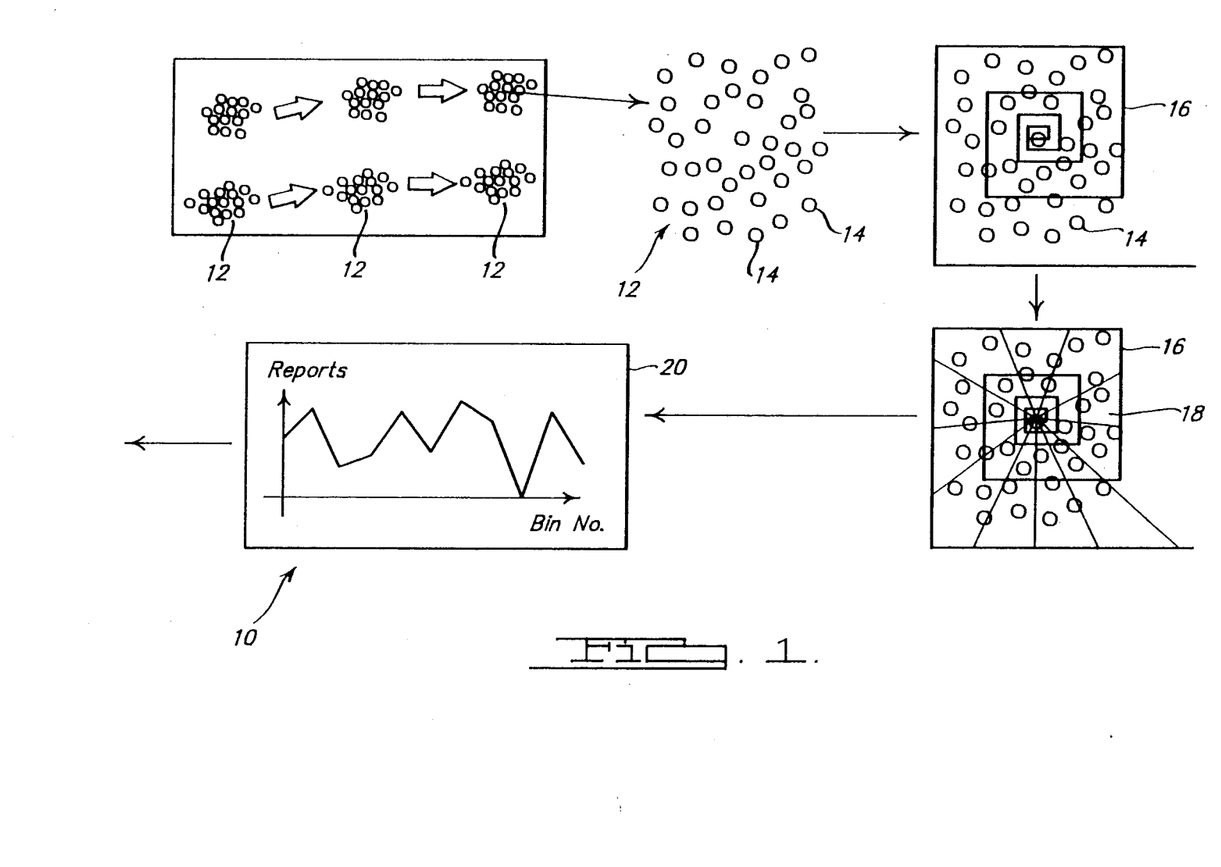
FIG. 1 is a diagram of the overall approach of the Fine-Grained Microstructure Processor in accordance with the present invention.

Referring now to FIG. 1, the overall approach of the FMP 10 in accordance with the preferred embodiments is shown. The input to the FMP 10 is a succession of scans 12 of two-dimensional object reports 14. It is assumed that the relative position of individual object reports 14 change from scan 12 to scan 12. The task of the FMP 10 is to assign each object report 14 in a scan 12 with an object report 14 and the next scan 12.

The problem is set up in the FMP 10 by creating a two-dimensional representation of the relative positions of objects on an X-Y grid, or array, of cells. The scan 12 is then divided into a number of regions. For example, a snail shape 16 may be superimposed on the scan 12 with a particular object 14 at its center. The snail shape 16 is then divided up into smaller segments 18 by drawing a radial pattern of lines which emanate from the object report 14 at the center. It can be seen that the individual segments 18 are smaller near the center object report 14 and larger further away from the center.

Figure 2:
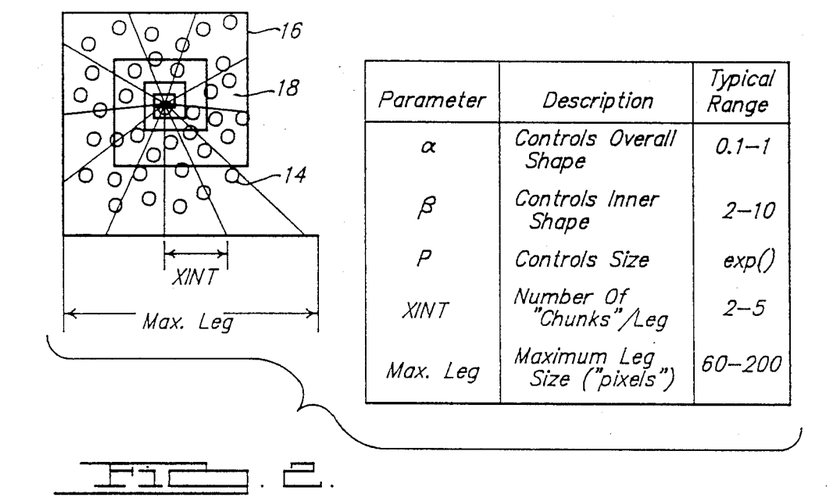
FIG. 2 is a diagram of the design parameters for the predefined shape of one embodiment of the present invention.

The snail shape 14 is described in more detail in FIG. 2. As shown in FIG. 2, the snail shape 14 can be described by the function $L_i = P\alpha[L_{i-1} - \beta]$. This equation defines the length $L_i$ of the $i^{th}$ leg of the snail. It is assumed but not required by this equation that each leg is at a 90° angle with the adjacent leg. $\alpha$ and $\beta$ are dimensionless constants which can be used to control the shape of the snail. P is a number with dimensions of length chosen to control the size of the snail. "Xint" is the number of chunks per leg, and "max leg" is the length of the final and longest leg. Thus, the snail equation provides a convenient means for adjusting the snail shape 16 to optimize the performance of the FMP 10 for any given application.

Referring again to FIG. 1, the FMP 10 counts the number of objects 14 in each segment in a given scan 12. This process in effect creates a histogram 20 of the number of objects 14 in each segment 18. It is a basic concept of the FMP 10 that this histogram 20 embodies information about the relative position of all of the objects 12 with respect to the one in the center, and that this information can be used to find the point in a second scan 14 whose histogram 20 best matches that in the first scan. It can be said that the two objects 14 matched in this way are the same object for tracking or correlation purposes.

Figure 3:
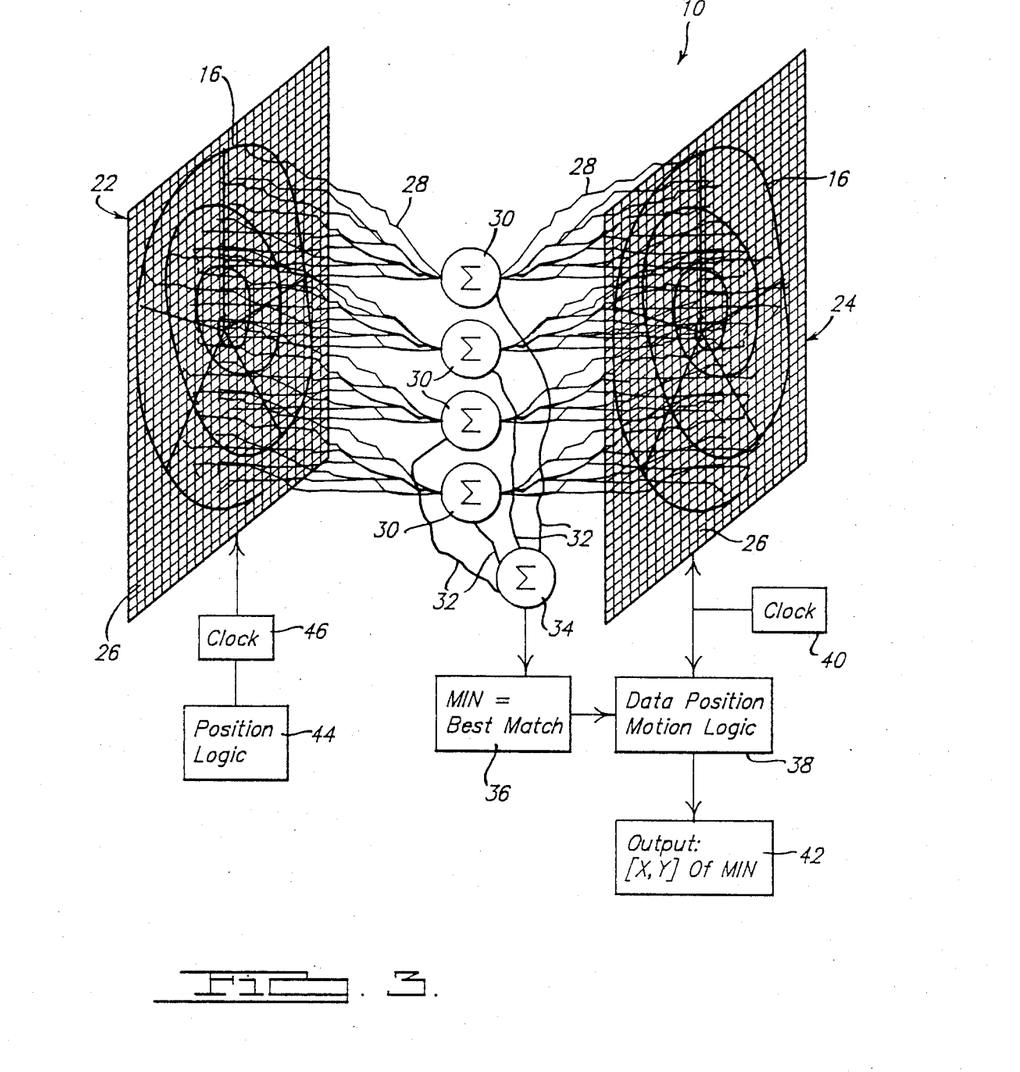
FIG. 3 is a diagram of the conceptual architecture of the Fine-Grained Microstructure Processor in accordance with the present invention.

The basic concept of the FMP 10 described in FIGS. 1 and 2 can be described in a neural model shown in FIG. 3. The object reports 14 in the first and second scans 12 are mapped onto first and second cellular arrays 22 and 24. Each cellular array 22, 24 comprises a fine-grained array of individual cells 26 arranged in a plane. Each cell 26 is capable of receiving and storing an object report 14 and is also capable of transmitting a signal or pulse when an object report 14 is present. Each cell 26 is also connected to a conductive means called a dendrite 28 capable of carrying the signal transmitted by the cells 26 which have object reports 14. All the dendrites 28 from each segment 18 in the first scan or scan one, snail 16 are connected to a single processing element 30. Likewise, all of the dendrites 28 from each corresponding segment 18 in the scan two snail 16 are connected to the same processing element 30 as those in the scan one segment 18. In this way, signals indicating the presence of object reports in the cells 26 in corresponding areas 18 of the first and second arrays 22 and 24 are all received by the same processing element 30.

The processing elements 30 contain a summing means that permits them to count the number of dendrites transmitting signals from each array 22 and 24. The processing elements 30 also contain a difference calculating means that permits them to calculate the difference between the number of signals transmitted from the first array 22 and second array 24. The difference derived by the processing element 30 is a measure of the similarity in the structure of the object reports in corresponding regions 18 of the snail 16 between the two scans. A difference is computed by each processing element 30 for each region 18. In this way, the FMP 10, in this embodiment, is in effect, comparing the histogram 20 shown in FIG. 1 for two successive scans 12 of data. If the two scans 12 were identical, the differences would all be zero.

The differences computed by each processing element 30 are then transmitted along conductors, called axons 32, to a final processing element or accumulator 34. The accumulator 34 is capable of adding up all of the difference signals from the axons 32. The smaller the sum computed by the accumulator 34, the better the match. This sum is the correlation factor and is then stored in a memory and comparator 36.

It is noteworthy that all the cells may transmit signals to the processing elements 30 simultaneously and all of the processing elements 30 may transmit differences to the accumulator 34 simultaneously. In this way the results can be obtained very quickly. Once a result is obtained with a given pair of cells in the center of the snail 16 in the first and second arrays 22, 34, all the other objects in the second array 24 are then checked. This is accomplished by moving the reports 14 from cell 26 to cell 26 until a new report 14 is at the center of the snail 16 in the second array 24 and the result is stored in the memory and comparator 36. The memory and comparator 36 may also store a set of addresses along with each result that will associate a particular location of all the object reports in the first and second arrays along with each result.

It is important that movement of the object reports 14 from cell 26 to cell 26 preserve the spatial relationship between each object report 14. That is, when one object report 14 moves one cell along the X axis, they all move one cell along the X-axis. Likewise, when one object report 14 moves one cell along the Y-axis, they all move one cell along the same direction. This movement is accomplished by a position motion logic controller 38 in conjunction with a clock 40 using one of a number of well known means for shifting data from one storage location to another.

The above process is repeated until a correlation factor is obtained and stored for the case of each object report in the second array 24 being at the center of the snail 16 while a single object report 14 is at the center of the scan one snail. The memory and comparator 36 may then determine which of all the stored correlation factors is the smallest. It will then transmit information identifying that scan two object report 14 which yielded the smallest correlation factor to an output unit 42. This information can then be used to determine which object reports 14 in scan one and scan two were at the center of the snail 16 when the minimum correlation factor was obtained. These two object reports 14 are then assigned to each other and the processing is complete for those two object reports. In particular, in accordance with this embodiment of the present invention, the two chosen object reports 14 can be considered to be the same object in a tracking application, and this information can be used in the desired manner. For example, in a tracking application, a line can then be drawn between the two objects to represent the path of travel of the object during the time interval between scan one and scan two.

To assign the other object reports 14 in the first array 22, all the object reports 14 in the first array 22 are shifted, preserving their relative positions, until a new object report 14 is in the center of the snail 16. The data movement may be accomplished utilizing a data position logic controller 44 and clock 46 in the same manner in which the data position logic controller 38 and clock 40 shift scan two data. As discussed above, all object reports in the second array 24, except for the one already assigned, are then checked to determine the "goodness" of the match. The object report 14 yielding the best match (smallest correlation factor) is then reported by the output unit 42.

This process is then repeated again until all objects in the first array 22 have been assigned to an object in the second array 24. It should be noted that for each succeeding object in the first array 22, one less object 14 in the second array 24 is available to be matched so one less object in the second array 24 need be checked. Assuming that the number of objects in the first and second arrays 22 and 24 are the same, when the FMP 10 reaches the last object 14 in the first array 22 there will be only one unmatched object 14 in the second array 24 so they can simply be matched up without further calculation. On the other hand, if there are a larger number of objects in the second array 24 than in the first array 22, the FMP 10 will still match up all of the objects in the first array 22 with objects in the second array 24 but there will simply be left over objects in the second array 24. Conversely, if there are more objects in the first than in the second array all objects in the first array will not be matched up and the processing will stop when all of the second array objects are used up.

Figure 4:
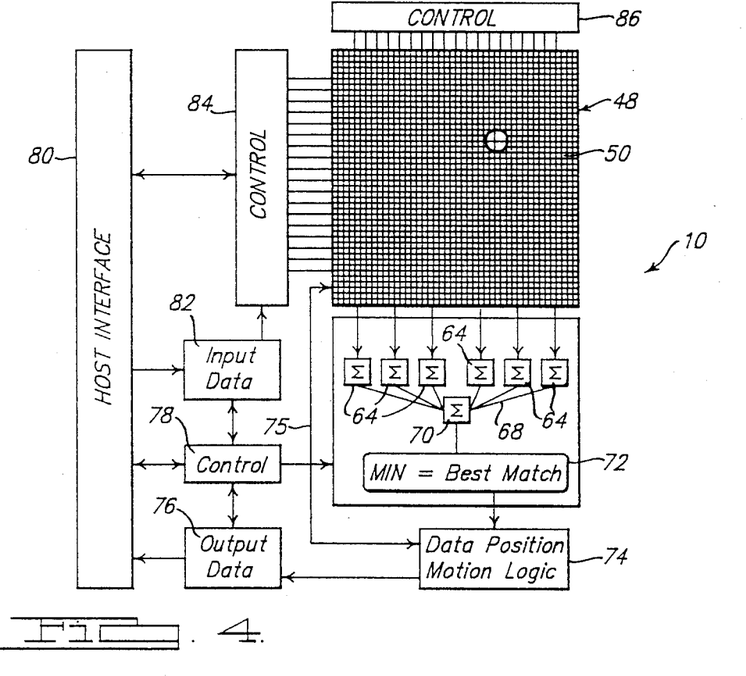
FIG. 4 is a block diagram of the primary functional elements of a preferred embodiment of the present invention.
Figure 5:
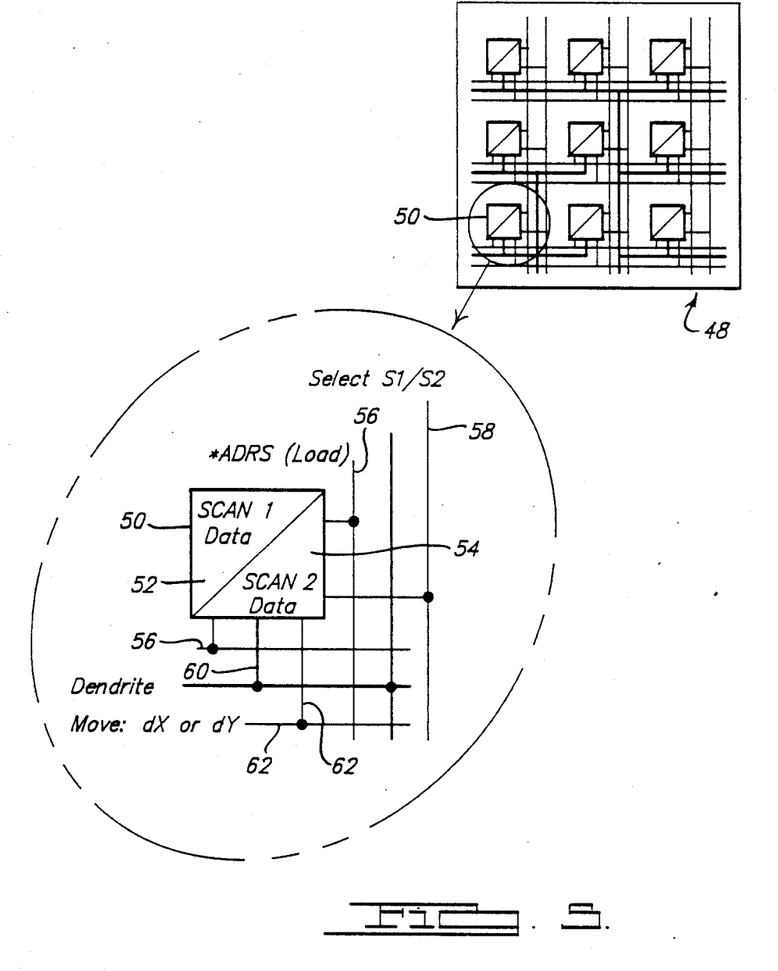
FIG. 5 is a diagram of the cell level functional layout of the preferred embodiment of the present invention.
Figure 6:
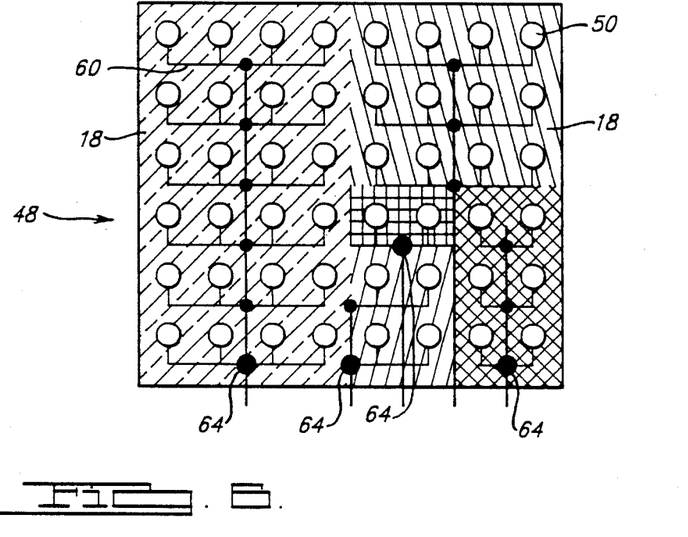
FIG. 6 is a diagram of the Axon/Dendrite tree layout in accordance with the preferred embodiment of the present invention.

Referring now to FIG. 4, a block diagram of the primary functional elements of one preferred embodiment of the FMP 10 is shown. In this embodiment the two arrays of cells 22, 24 shown in FIG. 3, are arranged on a single plane 48. Despite this, the FMP 10 shown in FIG. 4 is functionally equivalent to the concept for the FMP 10 shown in FIG. 3. As shown in FIG. 5 this single plane implementation is accomplished by pairing corresponding cells in the first and second arrays into single bifurcated cells 50. The bifurcated cells 50 operate as if they were two of the individual cells 26 described in connection with FIG. 3. Each bifurcated cell 50 is divided up into a scan one portion 52 and a scan two portion 54. Each portion 52, 54 is independently capable of accepting and storing and transmitting signals indicating the presence of an object report 14 in that location in the X-Y plane. The scan one portion 52 and the scan two portion 54 represent identical corresponding portions of the snail regions 18. As shown in FIG. 6, each bifurcated cell 50 is connected to address lines 56 used to load object report data into the cells 50. A Select S1/S2 line 58 is provided to select which cell, i.e., scan one cell 52 or scan two cell 54, is to be loaded or unloaded with data.

When signals are to be transmitted from cells 50 having object reports, the cell 50 transmits a signal to a dendrite 60. (This dendrite 60 corresponds to the dendrites 28 shown in FIG. 3). Data control lines 62 are also connected to each cell 50. The data control line 62 effects the transfer of data from cell 50 to cell 50 in either the X direction of the Y direction as required during the various processing steps of the FMP 10.

The next level of organization of the cellular array 48 is shown in FIG. 6, which depicts the axon/dendrite tree layout for various snail segments 18 in the FMP 10. Each bifurcated cell 50 shown in FIG. 6 is grouped with those cells 50 which represent a given segment 18. In FIG. 6 the different segments 18 are represented by different background patterns. Moreover, it can be seen that all cells 50 in a given segment 18 are connected by interconnected dendrites 60 to a common processing element 64. In this way, when those cells 50 in a given region 18 having object reports 14 transmit signals, the signals all converge on a single processing element 64. These processing elements 64 correspond to the processing elements 30 shown in FIG. 5.

It should be noted that while the dendrites 60 are shown as single lines in FIGS. 5 and 6, in actuality the dendrites 60 are actually multiple signal paths. In particular, in FIG. 5 the dendrite 60 coming from a cell 50 is capable of carrying both scan one signals and scan two signals from the scan one portion 52 and the scan two portion 54 independently to the processing element 64. This is necessary for the processing element 64 shown in FIG. 6 to accomplish the desired functions, i.e., to sum all scan one signals in a given region 18; sum all scan two signals, and take the difference between the scan one sum and the scan two sums. While only six processing elements 64 are shown in FIG. 4, it will be appreciated that the exact number of processing elements 64 will be the number of snail regions 18 that exist in the particular FMP 10.

All processing elements 64 are connected by axon 68 to an accumulator 70. The differences computed by the processing element 64 are transmitted to the accumulator 70. This accumulator 70 corresponds to the accumulator 34 shown in FIG. 3. Accordingly, it adds all the differences received from the processing elements 64 and calculates a single sum that represents a global correlation factor for a given position of the two scans in the cellular array 48. This sum is then stored in a memory and comparator 72, which corresponds to the memory and comparator 36 described in connection with FIG. 3. A data position logic controller 74 is connected to the memory and comparator 72 and senses when a result is obtained and accomplishes a shift of data from cell to cell as required. In particular, the data position logic controller 74 is connected along control bus 75 to the Select S1/S2 lines 58 and the data transfer line 62, shown in FIG. 5 to select whether scan one or scan two data is to be transferred, and to actually transfer the data along the X or Y axis until a new object report is at the center of the snail 16.

Once all scan two objects have been checked with a given scan one object the memory and comparator 72 will also identify the pair of object reports which resulted in the minimum sum by the accumulator 70. The identification of these positions (for example by their original X, Y coordinates in the two scans) is transmitted through the data position controller 74 to an output data controller 76. The output data controller 76 stores all matched object reports. Once all scan one objects are matched, a control device 78 stops the process and the results are reported to a host interface 80.

The host interface 80 also performs the functions of loading new data, comprising a new set of scan one and scan two object reports, into the cellular array 48. This is accomplished by feeding data from the host interface 80 through an input data controller 82 which transmits the data to a pair of cell controllers 84 and 86. The cell controllers 84, 86 are connected to the individual address lines 56 shown in FIG. 5 as well as the select S1/S2 lines 58.

Once the FMP 10 has associated all the scan one objects with scan two objects, further processing may be done, for example to continue the tracking on subsequent scans. Thus, scan two objects may then be associated with scan three objects and so on.

Figure 7:
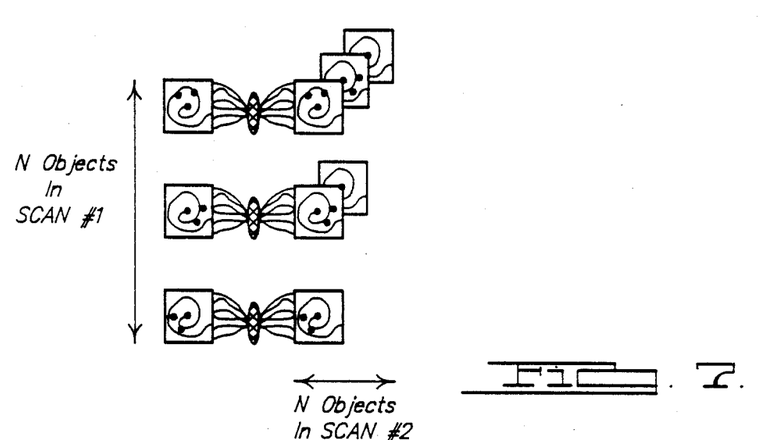
FIG. 7 is a diagram analyzing the various cycles of the Fine-Grained Microstructure Processor.

The time required to process data by the FMP 10 can be determined by reference to FIG. 7. In a given set of scans where there are N objects in scan one and N objects in scan two, to match the first scan one object reports will require checking N different scan two object reports, or N cycles. To match the next scan one object will require N-1 cycles since one scan two object has already been eliminated. Thus the total number of cycles required will be $N+(N-1)+(N-2)+ \ldots (1) = N^2/2$. Due to the massive parallelism of the FMP 10 about 99% of the processing time will be due to moving scan data and only 1% will be for actual calculating of correlation factors. Assuming N=100,000 the total number of cycles will be $N^2/2 = 5 \times 10^9$. If scan one and scan two are separated by 10 seconds, real time analysis would then permit two nanoseconds per cycle. Assuming that object reports are positioned, on average, between 5 cells and 50 cells apart, then it is estimated that between 0.04 nanoseconds and 0.4 nanoseconds would be available to move data from cell to cell.

Figure 8:
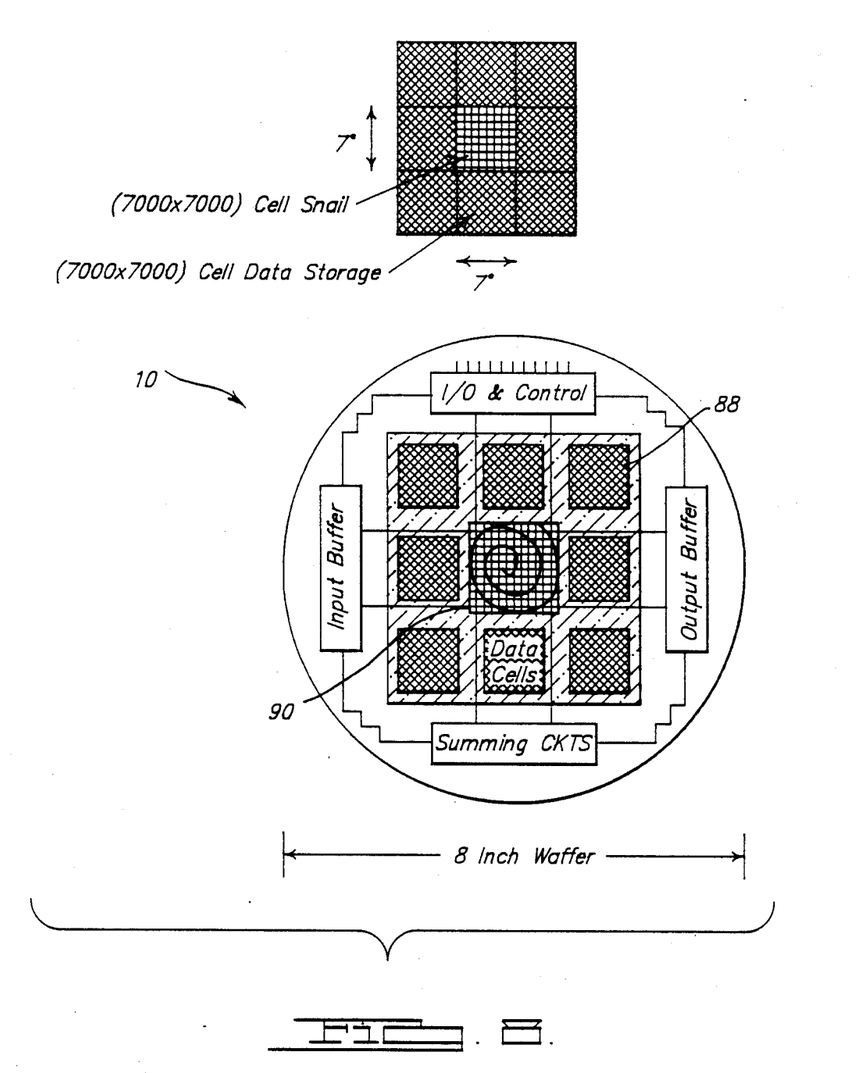
FIG. 8 is a diagram of a wafer scale embodiment of the Fine-Grained Microstructure Processor.

The FMP 10 also can be implemented using wafer scale integration. This is particularly advantageous in applications where a minimum of space, weight and power are available. FIG. 8 shows a block diagram of a wafer scale embodiment of the FMP 10. It is estimated that on an 8" wafer, data cells 88 which are used to store data which is moved outside the region covered by the snail cells would require a cell complexity of two devices per cell. Assuming VLSI technology of 0.5 microns on a side per device, the total length of 7,000 data cells would be about 0.66 inches. Snail cells 90 which are used to hold data during plane-to-plane correlation processing would require 10 devices per cell and thus 7,000 snail cells would require a total length of 4.15 inches. Consequently, two arrays of data cells 88 plus one array of snail cells 90 across the diameter of the wafer in FIG. 8 would occupy at least 4.15+2(0.66)=5.47 inches.

While the above embodiment of the FMP 10 was directed to the problem of object association and track initiation it will be appreciated that the present invention can be also used to address many other assignment and/or correlation problems. The use of the FMP 10 for other problems would simply require appropriate representation of the problem in terms of the cells in the multiplanar array. For example, the FMP 10 may be used for template matching and two-dimensional filtering. In this case, the task would be to determine what kind of object is represented by image data consisting of individual pixel points. For example, in one application, one scan in the FMP 10 processor would comprise the image data and the other scan would comprise the image to be recognized. The FMP 10 would then move the template about to find the best match against the image data.

It will also be appreciated that the FMP 10 depicted in FIG. 4 is but one way of implementing the present invention, and many other architectures can be derived which perform the processing steps of the FMP 10. From the foregoing it can be appreciated that the present invention provides a FMP 10 that is capable of solving correlation and assignment problems in real time with a minimum of hardware, cost and complexity at speeds many times greater than conventional solutions. Those skilled in the art can appreciated that other advantages can be obtained from the use of this invention and that modification may be made without departing from the true spirit of the invention after studying the specification, drawings and following claims.

What is claimed is:

1. A method for associating a first set of data points with a second set of data points, said method comprising:
    a. locating each data point in the first set at a given position in a first two-dimensional array, and locating each data point in the second set at a given position in a second two-dimensional array;
    b. defining a plurality of two-dimensional regions having predetermined shapes within the first and second arrays, said regions in the first array having corresponding regions with the same shape in the second array;
    c. defining a single position within each of said two-dimensional arrays having a fixed relationship with said regions, said data points being located in said first and second array so that one data point is at the single position;
    d. adding the number of data points in each region;
    e. for each of said regions in said first array, subtracting the total number of data points in said region, from the total number of data points in the corresponding region of the second array;
    f. adding up all said differences for each region to arrive at a correlation factor;
    g. moving said data points in the second array, keeping the data points fixed with respect to each other until a different data pint occupies the single position, and repeating steps d-f until a new correlation factor is derived;
    h. repeating step g for every point int he second array so that a correlation factor is derived for each data pint in the second array when it occupies the single position;
    i. finding the minimum of said correlation factors; and
    j. identifying the data point that occupies the single position when the minimum correlation factor was derived, wherein the point at the single position in the first array is associated with the data point in the single position int he second array when the minimum correlation factor was derived.

2. The method of claim 1 further comprising the steps of repeating steps c-j for each data point int he first array until each data point in the first array is associated with a data point int he second array.

3. The method of claim 1 wherein said steps of defining a single position within each of said two-dimensional arrays further comprises defining the position which is generally at the center of said predefined regions.

4. The method of claim 1 wherein said steps of defining a plurality of regions further comprises defining said regions by defining a generally spiral shape with said single position at its center and further dividing the spiral shape into a plurality of regions such that regions near said single position are smaller in area than regions further from said single position.

5. The method of claim 1 wherein the step of counting the data points in the regions of the first and second arrays further comprises the step of transmitting signals from said points in said arrays, representing data points and counting said transmitted pulses.

6. A method for associating data points in a first set with data points in a second set, said method comprising:
    a. assigning data points in the first set to cells in a first two-dimensional array of cells;
    b. assigning data points in a second set to cells in a second two-dimensional array of cells;
    c. defining predefined two-dimensional geometric shapes around one data point int he first array and around one data point in the second array, said predefined shaped being divided into a number of regions;
    d. transmitting a signal from each cell having a data point and summing all the transmitted signals form each region of the predefined shape;
    e. finding the difference between the sum from each region in one array and the sum from the corresponding region in the other array;
    f. summing the differences from each corresponding region;
    g. storing said sum;
    h. moving said data points int he second array, keeping the data points fixed with respect to each other until a different data point occupies the center of the predefined shape, and repeating steps c-f until a new sum is stored;
    i. repeating step h for every data point in the second array wherein a sum is stored for each data point when it occupies the center of the shape;
    j. finding the minimum of said sums; and
    k. identifying the data pints that occupy the center of said predefined shapes when said minimum sum was derived, wherein the point at the center of said predefined shape in the first array is associated with the data point in the center of the predefined shape in the second array when the minimum sum was found.

7. The method of claim 1 further comprising the steps of repeating steps d-j for each data point in said first array whereby each data point in the first array is associated with a data point in the second array.

8. The method of claim 6 wherein said steps of defining a plurality of regions further comprises defining said regions by defining a generally spiral shape and further dividing the spiral shape into a plurality of regions.

9. An information processor for associating a first set of data points with a second set of data points said processor comprising:
   a first and second array of cells, said cells being capable of storing one of said data points, and also capable of transmitting a signal when said data point is present;
   said first and second arrays being divided into a number of regions, said regions being formed by dividing up a predefined shape wherein one data point is at a particular position with respect to the predefined shape;
   means for receiving and adding the signal transmitted from each cell within a predefined region of the first and second arrays;
   means for finding the difference between the sum from each region in one array and the sum from the corresponding regions in the other array;
   means for adding up all said differences for each region to arrive at a correlation factor;
   means for moving said data points in the second array, keeping the data points fixed with respect to each other until a different data point occupies said particular position wherein a new correlation factor can be determined or each data point in the second array;
   means for finding the minimum of said correlation factors; and
   means for identifying the data point that occupies the particular position when the minimum correlation factor was derived, wherein the point at the particular position in the first array is associated with the data in the particular position in the second array when the minimum correlation factor was derived.

10. The apparatus of claim 9 further comprising:
    means for moving said data points in the first array, keeping the data points fixed with respect to each other so that a different data point occupies said particular position, whereby each point in the first array can be associated with a point in the second array.

11. The apparatus of claim 9 wherein said particular position within each of said two-dimensional arrays is a position which is approximately at the center of said predefined regions.

12. The apparatus of claim 9 wherein said predefined shape is generally a spiral shape.

13. The apparatus of claim 9 wherein said first and second arrays lie on two independent planes.

14. The apparatus of claim 9 wherein said first and second arrays are combined onto a single plane, and said cells comprise bifurcated cells each comprising a pair of corresponding cells from the first and second arrays.

15. The apparatus of claim 9 wherein said data points represent object reports from a sensor.

16. The apparatus of claim 9 wherein said data points represent individual pixel points in image data.

* * * * *